July 29, 1924.
O. L. BARNEBEY
1,502,897
APPARATUS FOR SEPARATING AND RECOVERING GASES
Original Filed July 20, 1920
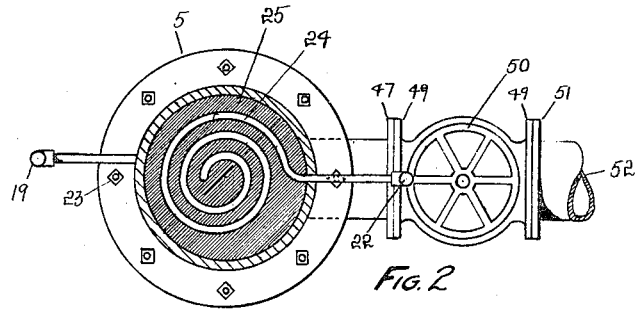
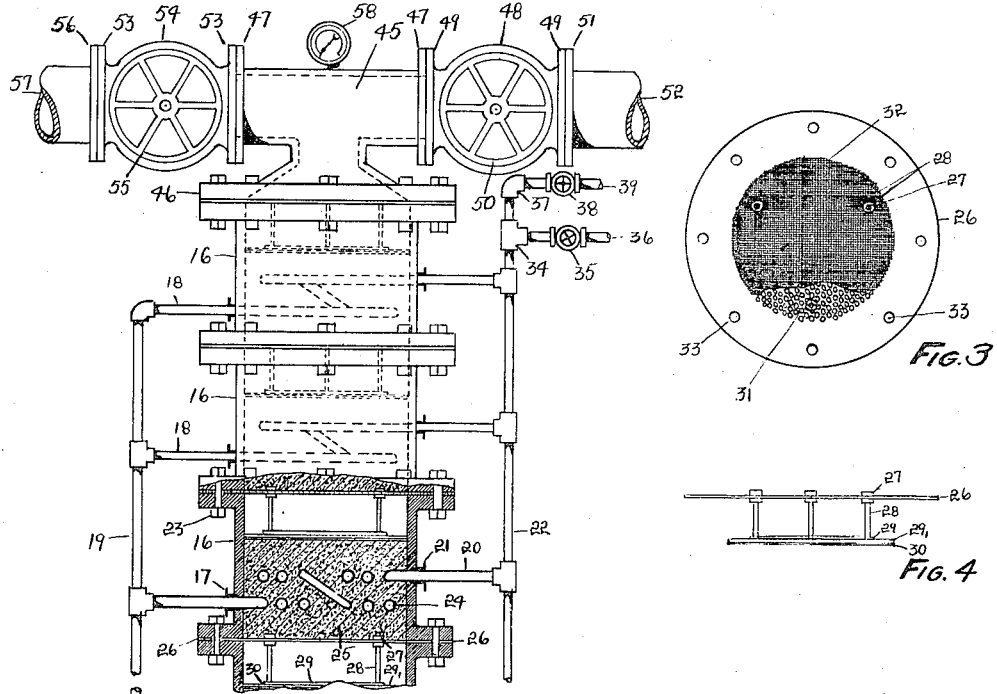
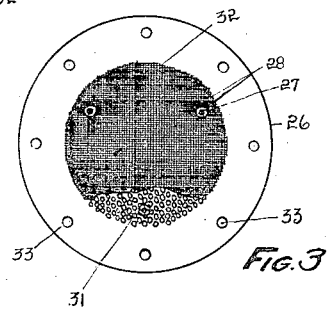
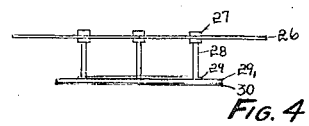
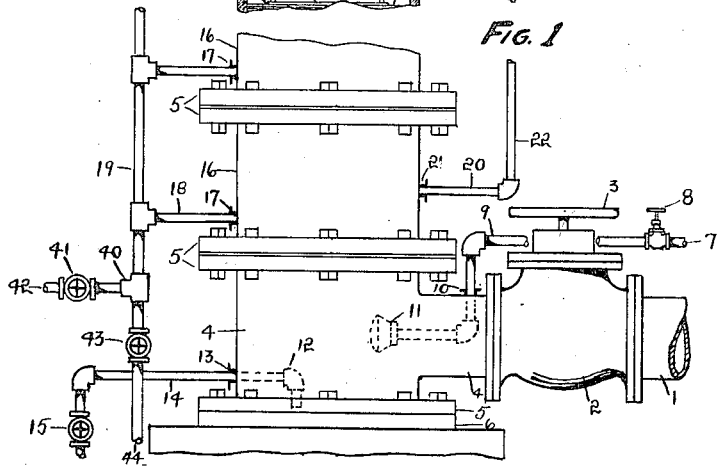
INVENTOR:
O. L. Barnebey Patented July 29, 1924.

1,502,897

UNITED STATES PATENT OFFICE.

OSCAR L. BARNEBEY, OF COLUMBUS, OHIO.

APPARATUS FOR SEPARATING AND RECOVERING GASES.

Original application filed July 20, 1920, Serial No. 397,745. Divided and this application filed July 29, 1922. Serial No. 578,332.

*To all whom it may concern:*

Be it known that I, OSCAR L. BARNEBEY, a citizen of the United States, residing in Columbus, in the county of Franklin and the State of Ohio, have invented certain new and useful Improvements in an Apparatus for Separating and Recovering Gases, of which the following is a specification, reference being had therein to the accompanying drawings.

My invention relates to an improved apparatus for seperating and recovering gases and vapors. In my co-pending application, Serial No. 397,745, filed July 20, 1920, and from which this application has been divided, I have described and claimed a process for separating and recovering gases involving the passage of the mixture through layers of adsorbing medium preferably highly activated carbonaceous material by which one or more constitutents of the gas or vapor is adsorbed and thus separated from the remaining constituent or constituents, after which the adsorbed gas or gases are generated from the adsorbing medium by means of steam or superheated steam and the generated gas condensed and separated from the condensed water.

The present invention involves the use of such an adsorption process and presents improved apparatus for working with gases under pressure higher than atmospheric, indeed capable of working with gases under very high pressure.

The following objects are attained:

1. Separation of the adsorbable and unadsorbable constitutents and recovery of the adsorbed constituents.

2. Effective and economic treatment of large quantities of gases.

3. Utilization of high pressure enabling processing of large quantities of gas within an apparatus of smaller capacity.

4. The equipment is designed in units, the sectional features making it easy to assemble and erect as well as change the capacity of the assembly whenever required by adding to or subtracting from the assembled equipment as many units as is necessary to adapt the equipment to the requirements.

5. Uses both direct and indirect steam heating and cooling.

6. Provides ease of assembly.

7. Requires a minimum of floor space.

8. Provides apparatus which is economical in first cost and operation of the same.

Other objects will be apparent from the following description:

When gases under normal pressure are passed through a good adsorbing medium like activated or adsorbent carbon certain gases or vapors in definite percentages are removed from the unadsorbed gases. If the pressure is increased not only is the volume of gases much decreased giving greater proportional capacity to any given size equipment but also the yield of adsorbed gas is much greater due to diminution of volume. The apparatus hereinafter to be described makes possible this greater yield of adsorbed gas or gases, accomplishing the features mentioned above under objects attained.

Referring to the drawings, Figures 1 to 4 inclusive, I shall describe my invention in detail:

Figure 1 is a side elevation partly in cross section.

Figure 2 is a transverse section.

Figures 3 and 4 are respectively a top plan view and side elevation of one of the separators used for disposing and spacing the layers of adsorbent material.

In these figures, I show and describe a high pressure adsorption tower which is of sufficiently heavy construction to withstand the pressures desired.

Referring to Figures 1 to 4, the adsorption tower is built up of cast iron sections sufficiently heavy to sustain the pressures to be applied in any specific application of the invention.

This tower is made up of sections 16, arranged in vertical series upon base 4 resting upon the base plate 6 which in turn is placed upon a solid foundation. To the base casting 4 is connected inlet 1 for the gaseous mixture the same being controlled by means of valve 2 by manipulation of valve handle 3. The top casting 45 fastens to the uppermost unit section 16 of the tower and branches two ways with valvular means for the adjustment and regulation of the same. In one direction the valve 48 and exit 52 connections are made to any appropriate condenser and in the other direction through valve 54 and exit 57 connection is made to any appropriate conduit or vessel adapted to receive the unadsorbed gas which passes through the adsorbing medium during the adsorption period of operation.

The compressed gaseous mixture enters through intake 1, passes through the opened regulating valve 2 controlled by handle 3 entering the base 4 which does not contain adsorbing material. From base 4 the gaseous mixture passes through the various sections 16 containing the adsorbing material 25. The flanges 5 fasten the sections 16 securely together and to the base 4 and upper connection 45. Gaskets 26 between the flanges give a very snug fit. The bottom flange 5 of the base 4 bolts to the flange 6 to give a tight bottom to the tower. A ring gasket provides a tight fit. This flange also provides a resting place for the tower which is set on the concrete foundation as indicated.

7 is a steam or superheated steam intake pipe, the quantity passing at any time, being regulated by valve 8. The connection 9 passes through stuffing box 10 and provides a tight fit into base 4. The steam finally passes out of nozzle 11 into base 4 from whence it passes up through the adsorbing material during the generating period of the cycle. The same pipe connections 7–11 inclusive are also used to inject water when water cooling is desired for cooling a gaseous mixture previous to passing through the adsorbing material. The pipe connection 12 passing out through stuffing box 13 through pipe 14 and valve 15 serves to remove any liquid condensate from the base 4 during the adsorbing part of the cycle and also to remove water from condensed steam during the generating period of the cycle of use. The valve 15 is closed except when removing condensate.

To each of the tower units 16 by means of stuffing boxes 17 is connected pipes 18 which join a manifold 19 which is used to remove condensed steam or cooling water from the coils 24. Valve 43 and pipe connection 44 is used to vent warm water previously used for cooling and valve 41 with pipe connection 42 is used to return hot condensed water to the boiler, the T 40 being used for distribution. To each of the sections 16 by means of stuffing boxes 21 pipes 20 connecting to manifolds 21 are used to introduce steam or superheated steam during the generating period and cooling water during the adsorbing period. In the cross section indicated 23 represents the heavy bolt construction fastening the sections 16 securely in position. The coil 24 is embedded in the adsorbing material 25 in such a manner as to give abundant surface of pipe to effect the required transfer of heat in both the generating and adsorbing cycles.

The adsorbent material layers 25 are supported and separated from each other by separators 27–30 each of which comprises a plate of expanded or perforated material 26 containing perforations 31, a sheet of wire screening 32, a lower sheet of expanded or perforated material 29 and a sheet of screening 30 attached thereto. The depending rods 28 being bolted at 27 join 26 and ring 29₁ which is attached to the perforated plate 29 serving to definitely separate the bottom plate 29 from the top plate 26. The peripheral part of the plate 26 is clamped between the flanges of the units 16 so that the plate 26 serves to support one layer of adsorbent material while the plates 29 suspended from it overlie the top of the next lower layer and with the screen 30 hold the material of the latter layer in place against the upward pressure of the gas.

On the uppermost unit 16 is attached the unit 45 with flanges 47. To one of these flanges 47 is attached the valve 48 with its flanges 49. The valve wheel 50 is used to regulate the opening and closing of valve 48. To the outer flange 49 is attached the exit pipe 52 by means of flange 51, 52 being connected to the condenser which is not shown. To the other flange 47 of top base 45 is attached a valve 54 by means of flange 53, the valve wheel 55 serving to regulate the opening and closing of the valve seat. To the outer flange 53 of valve 54 is attached the exit 57 for the adsorbed gas by means of flange 56. Gauge 58 indicates the pressure within the tower. Figure 2 indicates the positioning of the coil 24 within the adsorbing material 25 in a horizontal cross section. The positioning of bolts 23 through flanges 5 to fasten section 16 securely in place shows more in detail than in Figure 1. A suitable condenser is attached to exit 52, said condenser being of any desirable type and capacity. When vacuum is desired the vacuum pump is attached also, usually between the condenser and the tower.

The operation of my improved form of apparatus is as follows:

A gaseous mixture under high pressure enters through pipe 1 with valve 2 opened to receive the gas. Meantime valve 48 is closed and valve 54 regulated with a proper opening to maintain the pressure within sections 16 of the tower, meantime 57 is connected to the gas main attached to receive the gas from the tower. Valve 15 is closed as likewise are valves 41 and 38. Cooling water is allowed to enter through pipe 36 through opened valve 35, this water passing through coil 24 meantime cooling adsorbent material 25 and passing out through pipes 18 and manifold 19 through the opened valve 43 to waste through pipe 44.

When sufficient gas has passed through the tower to saturate the adsorbent material with adsorbable constituents valve 2 is closed by means of handle 3. Valve 54 is closed by means of 55. Water is shut off at 35 and 43. Any condensed liquid is removed from the base 4 by opening valve 15 after which the valve is closed again. If any considerable amount of liquid is condensed during the adsorbing period of the cycle 15 can be opened as frequently as necessary to free the base of liquid. Valve 48 is now opened by means of handle 50 thus connecting the tower to a suitable condenser. Valve 38 is opened allowing steam or superheated steam to enter manifold 22 and through pipes 20 and then into coils 24 thus heating the adsorbent material containing adsorbed gas. The condensed water from the steam is removed by opening valve 41, 42 being connected to a steam trap to return the hot condensate to the boiler supplying the steam. Meantime when desired, valve 8 can be opened to introduce steam through connection 7 entering under direct boiler pressure or in a highly superheated condition any desired superheat being produced by any conventional superheater attachment in connection with the boiler being used. The introduction of the steam gives an effect of steam distillation which is very highly desirable in many cases. Also it facilitates the rapid heating up of the adsorbing material, thus greatly shortening the time of distillation in many cases.

The distilling operation is continued until the adsorbable constituents have been substantially removed from the adsorbing material. The liquid from the container in all cases where steam is not introduced directly through the connection 7-11 inclusive is taken directly from the condenser reservoir, barreled or otherwise packaged. However, when the steam is used the desired liquid from the condenser must be separated from the water in case the liquid is immiscible with water. The water and liquid other than water are allowed to separate after which the liquid desired is syphoned away from the water. In cases, however, when the liquid desired is miscible with water, then other separation must be carried out in order to remove the desired liquid from the water, the usual operation being distillation. In case the liquid is more volatile than the water the water remains in the still when the distillation of the desired liquid has been completed. In cases where water is more volatile than the liquid desired then the latter is the residual liquid after boiling off the water.

As soon as distillation is complete valves 38, 31 and 48 (and 8 if used) are closed and valves 35, 2, 43 and 54 are again opened allowing the gas to enter again through 1 and the adsorption period repeated. Thus the adsorption period and generating period can be repeated again and again with the same material. All that is necessary is to change the valvular means for entrance and exit of the apparatus to gases and entrance and exit of steam, superheated steam and water to maintain the tower in continual operation.

By means of my apparatus I am able to recover gasoline from natural gas, pyridine from ammonia, toluol and benzol from artificial gas and other gases which are adsorbable with my adsorbing material as distinguished from the diluent gas or gases from which the gas or gases is to be separated.

It is understood that by my reference to the word "gases" which are to be adsorbed is also to be included vapors of the adsorbable nature, many of which are readily separated from diluent gases by means of adsorbing material and my high pressure tower just described. It is to be further understood that the use of my apparatus herein described is broad in nature and not limited to the particular applications which I have named. Also the variations as to details of construction are numerous and yet not departing in principle from the fundamentals of my invention. For instance, when I mention cast iron construction, it is understood that cast steel or any heavy metal construction equivalent to cast iron may be used and not depart from the scope of my invention. Also various arrangements of heating and cooling coils, etc., are easily made and such changes from my description and specification do not depart from my invention.

I claim:

1. In apparatus for separating the constituents of gaseous mixtures by adsorption under pressure, the combination of a plurality of separable metallic container sections comprising end sections and a series of intermediate sections, separated layers of adsorbent material in said intermediate sections, foraminous plates engaging the opposite sides of each layer of adsorbent material to hold it in position against the force of gravity and the force of gas under pressure, an inlet passage in one of said end sections for the gaseous mixture to be treated, valved outlet passages in the other end section for unadsorbed gas and adsorbed gas, respectively, and means for controlling the temperature of the adsorbent material.

2. In apparatus for separating the constituents of gaseous mixtures by adsorption under pressure, the combination of a tower structure comprising metallic end sections and a series of intermediate metallic sections separable from each other and from the end sections, a series of separated layers of adsorbent material in the intermediate sections, foraminous diaphragms clamped between adjacent sections of the tower to support the layers of adsorbent material, foraminous plates overlying the layers of adsorbent material and spacing means between the said diaphragms and plates to hold the latter in position and prevent upward displacement of the adsorbent material, an inlet passage in one of the end sections for the gaseous mixture to be treated, valved outlet passages in the other end section of the tower for unadsorbed gas and adsorbed gas, respectively, and means for controlling the temperature of the adsorbent material.

3. In apparatus for separating the constituents of gaseous mixtures by adsorption under pressure, the combination of a tower structure having an inlet passage for gas to be treated at one end and outlet passages for unadsorbed gas and adsorbed gas, respectively, at the other end, a series of separated layers of adsorbent material in the tower, means for introducing steam into the tower in direct contact with the adsorbent material, and a valve-controlled passage leading from the bottom of the tower for the discharge of condensed liquids.

4. In apparatus for separating the constituents of gaseous mixtures by adsorption under pressure, the combination of a plurality of separable metallic container sections comprising end sections and a series of intermediate sections, separated layers of adsorbent material in said intermediate sections, foraminous plates engaging the opposite sides of each layer of adsorbent material to hold it in position against the force of gravity and the force of gas under pressure, an inlet passage in one of said end sections for the gaseous mixture to be treated, a valved outlet passage in the other end section for unadsorbed gas, a valved outlet from the container sections for adsorbed gas, and means for controlling the temperature of the adsorbent material.

5. In apparatus for separating the constituents of gaseous mixtures by adsorption under pressure, the combination of a tower structure comprising metallic end sections and a series of intermediate metallic sections separable from each other and from the end sections, a series of separated layers of adsorbent material in the intermediate sections, foraminous diaphragms between adjacent sections of the tower to support the layers of adsorbent material, foraminous plates overlying the layers of adsorbent material and spacing means between the said diaphragms and plates to hold the latter in position and prevent upward displacement of the adsorbent material, an inlet passage in one of the end sections for the gaseous mixture to be treated, a valved outlet passage in the other end section of the tower for unadsorbed gas, a valved outlet passage from the tower for adsorbed gas, and means for controlling the temperature of the adsorbent material.

In testimony whereof, I hereunto affix my signature.

OSCAR L. BARNEBEY.